United States Patent
Arai

(10) Patent No.: US 7,316,854 B2
(45) Date of Patent: Jan. 8, 2008

(54) PROTON CONDUCTING MATERIAL, PROTON CONDUCTING MEMBRANE, AND FUEL CELL

(75) Inventor: Takuichi Arai, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 554 days.

(21) Appl. No.: 10/798,432

(22) Filed: Mar. 12, 2004

(65) Prior Publication Data

US 2004/0180251 A1  Sep. 16, 2004

(30) Foreign Application Priority Data

Mar. 14, 2003  (JP)  ............................. 2003-069638

(51) Int. Cl.
*H01M 8/10* (2006.01)
*C04B 33/00* (2006.01)

(52) U.S. Cl. ........................................ 429/33; 501/141

(58) Field of Classification Search ................. 429/33; 501/141
See application file for complete search history.

(56) References Cited

U.S. PATENT DOCUMENTS 6,042,839 A * 3/2000 Lahanas et al. ............. 424/401
7,049,020 B2 * 5/2006 Kerres et al. ................. 429/33
2002/0094466 A1   7/2002 Karres et al.
2004/0081823 A1 * 4/2004 Arai ........................... 428/331

FOREIGN PATENT DOCUMENTS

| DE | 199 19 881 A 1 | 11/2000 |
| JP | 05-254824 | 10/1993 |
| JP | 2001-307545 | 11/2001 |
| WO | WO 00/74827 A2 | 12/2000 |
| WO | WO 2004/038839 A1 | 5/2004 |

OTHER PUBLICATIONS

Official Letter as issued by the German Patent and Trademark Office (Sep. 2004).

* cited by examiner

*Primary Examiner*—Stephen J. Kalafut
(74) *Attorney, Agent, or Firm*—Finnegan, Henderson, Farabow, Garrett & Dunner, L.L.P.

(57) ABSTRACT

A proton conducting material and proton conducting membrane which have high proton conductivity, high strength, flexibility (strong against deformation), and high size stability when swollen (water absorbed) are provided. The proton conducting material and the proton conducting membrane are formed by crosslinking the unit structure of a layered clay mineral, wherein a polyvalent metal ion is incorporated between layers of the layered clay mineral.

13 Claims, No Drawings

PROTON CONDUCTING MATERIAL, PROTON CONDUCTING MEMBRANE, AND FUEL CELL

BACKGROUND OF THE INVENTION

1. Field of the Invention

The present invention relates to a proton conducting material, a proton conducting membrane, method for producing the same, and fuel cell using the same. More particularly, the present invention relates to a proton conducting material and proton conducting membrane, which have both strength and ion conductivity, and which are suitable for a proton conducting membrane used in a fuel cell, water electrolysis, hydrohalic acid electrolysis, brine electrolysis, an oxygen concentrator, a humidity sensor, a gas sensor and the like.

2. Background Art

A solid polymer electrolyte of a proton conducting material is a solid polymer material which has an electrolyte group such as a sulfonic acid group in the polymer chain, wherein since it can strongly bond to a specific ion and allow positive or negative ions to selectively permeate, it may be formed into particles, fiber or a membrane for use in a variety of applications such as fuel cells, electrodialysis, diffusion dialysis, and battery barrier membranes.

For example, fuel cells convert and extract the chemical energy of a fuel to direct electrical energy through electrochemical oxidation of the fuel in the cell such as hydrogen or methanol. In recent years, fuel cells have been drawing attention as a clean source of electric energy. Solid polymer fuel cells which use a proton conducting membrane as the electrolyte are in particular being anticipated as an electricity source for electric vehicles in view of the fact that they can operate at low temperatures and can achieve high output density.

The basic configuration of such a solid polymer fuel cell comprises an electrolyte membrane and a pair of gas diffusion electrodes having a catalyst layer which are coupled to both surfaces of the membrane, wherein a current collector is further provided on both sides thereof. One of the gas diffusion electrodes (anode) is provided with fuel in the form of hydrogen or methanol, while the other gas diffusion electrode (cathode) is provided with an oxidant in the form of oxygen or air, whereupon an external load circuit is connected between the two gas diffusion electrodes for operation as a fuel cell. At this time, the protons generated at the anode move towards the cathode side through the electrolyte membrane, and react with oxygen at the cathode generating water. Here the electrolyte membrane functions as a barrier membrane between the proton transporting medium and the hydrogen gas or oxygen gas. Thus, high proton conductivity, strength and chemical stability is required for this electrolyte membrane.

On the other hand, as a catalyst for a gas diffusion electrode, in general a precious metal such as platinum supported on a carrier having electron conductivity such as carbon is used. As the electrode catalyst binding agent, which channels proton movement onto the catalyst supported on this gas diffusion electrode, a proton conducting polymer electrolyte is usually used for the purpose of increasing the catalyst usage efficiency, although a fluorine-containing polymer having a sulfonic acid group, such as a perflurosulfonic acid polymer the same as the ion-exchange membrane, can also be used as this material. Here, the fluorine-containing polymer having a sulfonic acid group, which is the electrode catalyst binding agent, can also play a role as a binder for the gas diffusion electrode catalyst, or as a cementing agent to increase the adhesion of the ion-exchange membrane to the gas diffusion electrode.

In the cases of fuel cells and water electrolysis, peroxide is generated at a catalyst layer formed at the interface of the solid polymer electrolyte membrane and the electrode, and while the generated peroxide is diffusing it becomes a peroxide radical which causes degradation reactions. Therefore, it is difficult to use hydrocarbon electrolyte membranes, which are poor in oxidation resistance. For that reason, for fuel cells, generally, a perflurosulfonic acid membrane, which has high proton conductivity and high resistance to oxidation, is used.

In addition, brine electrolysis is a method for producing sodium hydroxide, chlorine, and hydrogen by electrolyzing an aqueous solution of sodium chloride using a solid polymer electrolyte membrane. In this case, because the solid polymer electrolyte membrane is subjected to chlorine and a high-temperature high-concentration aqueous solution of sodium hydroxide, hydrocarbon electrolyte membranes which have poor oxidation resistance cannot be used. Thus, for a solid polymer electrolyte membrane for brine electrolysis, generally, a perflurosulfonic acid membrane which is resistant to chlorine and high-temperature high-concentration aqueous sodium hydroxide, and further which partially incorporates a carboxylic acid group on its surface in order to prevent reverse diffusion of the generated ions is used.

However, fluorine based electrolytes as represented by a perflurosulfonic acid membrane, have very high chemical stability because they contain C—F bonds, and in addition to being used in the above-mentioned fuel cells, water electrolysis or brine electrolysis, may be used as the solid polymer electrolyte membrane for hydrohalic acid electrolysis. In addition, using their proton conductivity, they may also be widely applied to humidity sensors, gas sensors, and oxygen concentrators and the like.

As the electrolyte membrane of the fuel cell, a fluorine based membrane, having perfluoroalkylene as the backbone, and partly having an ion-exchange group such as a sulfonic acid group or a carboxylic acid group at a terminal end of perfluorovinyl ether side chains may be used. Fluorine based electrolytes such as those represented by a perflurosulfonic acid membrane, because they have very high chemical stability, are recommended as an electrolyte membrane that can be used under severe conditions. As such a fluorine based electrolyte membrane, Nafion membrane (Du Pont, registered trademark), Dow membrane (Dow Chemical), Aciplex membrane (Asahi Kasei Corporation, registered trademark), and Flemion membrane (Asahi Glass, registered trademark) and the like are known.

However, production of fluorine based electrolytes is difficult, and very expensive. Along with these problems, fluorine based electrolytes also have the drawback that they are unable to sufficiently accommodate the high temperature operation of a fuel cell.

For that reason, development of a material with ion conductivity and ion exchangeability to replace fluorine based electrolyte membranes has been desired. One of those is disclosed in the following JP Patent Publication (Kokai) No. 2001-307545 A (2001), a proton conductive membrane comprising an organic material having a backbone of a polytetramethylene oxide and a three-dimensionally crosslinked structure containing a specific metal-oxygen bond, and containing an agent for imparting proton conductivity and water in the membrane.

The three-dimensionally crosslinked structure disclosed in JP Patent Publication (Kokai) No. 2001-307545 A (2001) is a proton conducting membrane comprising an organic and inorganic materials so that while heat resistance improves due to the inorganic constituent, strength is insufficient, whereby the membrane becomes fragile, so that at the time of processing if stress is applied it will be damaged. In particular, the membrane breaks from gas pressure or shock when being used as a fuel cell. This is caused by the tensile strength and flexibility not being sufficient in the above-mentioned three-dimensionally crosslinked structure. Further still, the three-dimensionally crosslinked structure did not have sufficient proton conductivity, and especially had problems with proton conductivity at high temperatures and low humidities.

On the other hand, JP Patent Publication (Kokai) No. 5-254824 A (1993), which is directed to a layered clay mineral, discloses making a thinner membrane without damaging any of the particular structural characteristics of layered clay minerals, by continuous bonding of the layered structure of a clay mineral using the reactivity between the aluminum and phosphoric acid or phosphate group contained in the layered clay mineral. JP Patent Publication (Kokai) No. 5-254824 A (1993) further discloses the production of a layered clay mineral thin membrane which bonds unit structures with a phosphate group, by developing on a substrate a developing liquid which contains a compound having a phosphoric acid group and a layered clay mineral comprising an aluminum backbone, then removing solvent from the liquid membrane on the substrate.

However, the layered clay mineral thin membrane disclosed in Patent Document 2 has low ion exchangeability, and its function when used as an ion-exchange membrane in a fuel cell is considerably weak. This is because the functional group governing ion-exchange is only the phosphate group crosslinking the clay mineral, so that compared with a conventional fluorine based ion-exchange membrane, ion exchangeability is low. Further, in addition to this layered clay mineral thin membrane having an insufficient proton conductivity, it has problems such as insufficient strength, insufficient flexibility (weak against deformation), insufficient size stability when swollen (water absorption) (in a restricted state size would change in the cell, causing it to burst), and uncontrollable gas permeability (for membranes shielding properties are important, and for a catalyst layer electrolyte permeability is important).

Therein, there was a need to develop a new proton conducting membrane and proton conducting material to replace the perfluorocarbonsulfonic acid based proton conducting membrane which was generally used for solid polymer electrolyte type fuel cells (PEFC).

It is an object of the present invention to solve the above problems of a conventional proton conducting material and proton conducting membrane, by providing a proton conducting material and proton conducting membrane with, in particular, high strength, flexibility (strong against deformation), and high size stability when swollen (water absorption). It is a further object of the present invention to realize a high performance fuel cell which uses these.

SUMMARY OF THE INVENTION

The inventors have, as a result of intensive research, found a solution to the above-mentioned problems in which a specific treatment is carried out on a layered clay mineral to achieve the present invention.

Namely, a first aspect of the present invention relates to a proton conducting material, which is a proton conducting material formed by crosslinking a unit structure of a layered clay mineral, wherein a polyvalent metal ion is introduced between layers of the layered clay mineral. The introduction of a polyvalent metal ion between layers of the layered clay mineral causes proton conductivity to be achieved by the hydrated polyvalent metal ions, so that high proton conductivity is conferred to the layered clay mineral.

The proton conducting material of the present invention is a thin membrane in which the unit structure of a layered clay mineral or complex thereof is bound to an acid or base thereof, or an organic compound having an acid group and the like. Examples of the layered clay mineral include, for example, natural montmorillonite, smectite, kaolinite, pyrophyllite, vermiculite, acid clay and hydrotalcite. These clay minerals are able to incorporate metal or organic ions and the like between layers. As a crosslinking agent for these, for example, an agent such as phosphoric acid is introduced which forms a bond with a reactive metal species (for example, an aluminum atom) on the terminal surface of the unit structure of the layered clay mineral, crosslinking clay mineral particles to form a thin membrane. Examples of crosslinking agents include an agent such as a metal alkoxide and its derivatives, or an acid and its derivatives, which are capable of complexing with a main constituent of a clay mineral such as alumina or silica.

In the present invention, the unit structure of the layered clay mineral is preferably such that it is crosslinked with a tetrafunctional alkoxide or trifunctional alkoxide. When crosslinked with a tetrafunctional alkoxide, because it is crosslinked with at least 3 of the bonding groups, the mechanical strength of the proton conducting material is increased. Further, when it is crosslinked with a trifunctional alkoxide, because it is crosslinked mainly through linear chains, the flexibility of the proton conducting material is increased.

In particular, crosslinking with a trifunctional alkoxide or tetrafunctional alkoxide incorporating a strong acid group is preferable. Not all of the bonds of a tetrafunctional alkoxide or trifunctional alkoxide are crosslinked; usually 1 or 2 bonds are not involved in the crosslinking. By incorporating at bonds which are not crosslinked a strong acid group having an ion exchangeable group, proton conductivity of the proton conducting material can be further increased.

In the present invention, it is preferable to have a cationic surfactant incorporated between layers of the layered clay mineral. Widening of the gap between layers through insertion of a large molecule, such as a surfactant between the layers, increases gas permeability of the proton conducting material, and is preferable when used for an electrode of a fuel cell.

Further, it is preferable that the unit structure of the layered clay mineral is crosslinked with an alkoxide which has a bulky functional group and small interaction. By crosslinking with an alkoxide which has a bulky functional group having small interaction, crosslinking occurs with the gap between layers widened, so that gas permeability of the proton conducting material increases. This is preferable when used for a fuel cell electrode.

Further, it is preferable that the unit structure of the layered clay mineral is crosslinked with bis-alkoxysilane. By crosslinking with bis-alkoxysilane, not only two-dimensional bonding in a direction parallel to the layered clay sheet, but bonding in a perpendicular direction is also promoted, wherein the structure of the proton conducting material is restrained in three dimensions, thereby suppressing shape deformation from swelling and the like.

Still further, it is preferable that the unit structure of the layered clay mineral is crosslinked with an alkoxysilane having an epoxy ring. At the time of crosslinking the epoxy ring opens, so that a large number of polyalkylene chains and ether bonds are formed in the proton conducting material. Because unpaired electron pairs on an ether chain act as a proton adsorption site with moderate hydrophilicity, the proton conducting material can form a proton conducting path even under low temperature conditions.

In a second aspect, the present invention relates to a method of preparing a proton conducting material, which comprises the steps of adding water to a layered clay mineral to obtain a dispersion liquid, adding a crosslinking agent to the dispersion liquid to obtain a developing liquid, developing the developing liquid on a substrate to obtain a developing liquid layer, drying the developing liquid layer by heating to obtain a thin membrane, and immersing the thin membrane in an aqueous solution having a polyvalent metal ion and drying.

Substrates on which is developed the developing liquid, include a glass substrate, a quartz substrate, a fluorophore, a graphite substrate and a porous polymer film. Once the solvent is removed from the developing liquid which is developed on the substrate, a thin membrane of layered clay mineral is formed. In order to regularly orient the thin membrane during the process of removing this solvent, the solvent is preferably removed slowly. For example, by drying in a thermostat bath set at close to a room temperature of 25° C. and relative humidity of 60%, a layered clay mineral thin membrane with fixed orientation can be obtained.

The obtained layered clay mineral thin membrane is self-supporting, so that it can be used as it is. However, further continuation of heat treatment is also possible. From such heat treatment the crosslinking reaction in the layered clay mineral proceeds effectively, thereby increasing self-supportiveness. Further, if excess crosslinking agent remains in the reaction, it is removed from the layered clay mineral thin membrane by an appropriate treatment. For example, phosphoric acid remaining in the thin membrane can be removed by washing the membrane with water. Alternatively, when an organic phosphate compound remains, the remaining phosphate compound is removed by washing the thin membrane with an organic solvent selected according to the type of phosphate compound.

In a third aspect, the present invention is a proton conducting membrane which comprises the above proton conducting material.

In a fourth aspect, the present invention relates to a method for producing a proton conducting membrane, which comprises the steps of producing a proton conducting material by the above method, dissolving or dispersing the proton conducting material for making a solution or a sol, and gelating by removing the solvent from the solution or sol.

In a fifth aspect, the present invention relates to a solid polymer fuel cell, wherein the solid polymer fuel cell has a membrane electrode assembly (MEA) which comprises (a) a polymer solid electrolyte membrane; and (b) a gas diffusion electrode, which electrode couples with the electrolyte membrane and has as a main constituent material an electrode catalyst which comprises a conductive carrier that supports a catalytic metal and a proton conducting material, wherein the polymer solid electrolyte membrane and/or the proton conducting material is the above-mentioned proton conducting material or proton conducting membrane.

DETAILED DESCRIPTION OF THE PREFERRED EMBODIMENTS

A great variety of materials may be applied as the layered clay mineral used in the present invention. Examples of the these materials include montmorillonite, smectite, vermiculite, mica, kaolinite, halloysite and pyrophyllite, and combination of a plurality of these layered clay minerals can also be used.

Preferable examples of the polyvalent metal ions incorporated between layers of the layered clay mineral include $Al^{3+}$, $Fe^{2+}$, $Ni^{2+}$ and $Sn^{4+}$. These polyvalent metal ions are incorporated between layers of the layered clay mineral preferably as a water-soluble salt. Usually, natural clay minerals contain sodium ions or calcium ions between layers, but in the present invention, they are substituted with the above polyvalent metal ion and a large number of the above polyvalent metal ion is newly incorporated.

Because the proton conducting material of the present invention has characteristics which allow it to strongly bond with specific ions, and positive ions or negative ions to permeate selectively, it can be formed into particles, fiber or a membrane shape. Further, a proton conducting material membrane of the present invention can be widely applied to a fuel cell, water electrolysis, hydrohalide acid electrolysis, brine electrolysis, an oxygen concentrator, a temperature sensor, a gas diffusion sensor and the like.

By using the proton conducting material or proton conducting material membrane of the present invention in a fuel cell, a fuel cell can be obtained which is superior in proton conductivity, is simple to produce and has low cost, is superior in high temperature operability and superior in mechanical strength.

EXAMPLES

The present invention will be further described in detail with reference to the following examples.

Example 1

In this example, a clay mineral thin membrane is produced which incorporates a polyvalent metal ion between layers and which is a clay mineral thin membrane with high proton conductivity.

Synthesis Example 1

Clay mineral: High purity sodium montmorillonite
Ion between layers: Aluminum (III) ions
Crosslink: Phosphoric acid To 400 mL of pure water was added 8 g of sodium montmorillonite at room temperature, and stirred for 24 hours to obtain an evenly dispersed solution. To this, 10 g of 10% orthophosphoric acid was added while slowly stirring and stirred for 1 hour. An appropriate amount was cast onto a plastic plate, then dried in a drying room controlled at 25° C. and 50% RH for 12 hours to a few days. After drying, a thin membrane was obtained, which was then heat treated for 24 hours in a 70° C. kiln. The obtained thin membrane was immersed in pure water and dried at room temperature. After this immersion and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give a phosphoric acid crosslinked clay thin membrane substituted with aluminum ions.

Synthesis Example 2

Clay mineral: High purity sodium montmorillonite
Ion between layers: Nickel (II) ions
Crosslink: Phosphoric acid
Nickel chloride (II) was used in place of the aluminum (III) of Synthesis Example 1.

Synthesis Example 3

Clay mineral: High purity sodium montmorillonite
Ion between layers: Tin (IV) ions
Crosslink: Phosphoric acid
Tin chloride (IV) was used in place of the aluminum (III) of Synthesis Example 1.

Example 2

In this example, a clay mineral thin membrane is produced which is crosslinked by an alkoxide having four functional groups and which incorporates a polyvalent metal ion between layers, and in which the clay mineral thin membrane has high strength and proton conductivity.

Synthesis Example 4

Clay mineral: High purity sodium montmorillonite
Ion between layers: Aluminum (III) ions
Crosslink: tetramethoxysilane To 400 mL of pure water was added 8 g of sodium montmorillonite at room temperature, and stirred for 24 hours to obtain an evenly dispersed solution. Meanwhile, 1.5 g of tetramethoxysilane was added to a solution in which 0.7 g of pure water and 0.7 g of methanol had been mixed, and well stirred. To this solution 0.04 g of 3.5% hydrochloric acid was added while stirring. The stirring was continued for a further 10 minutes, then the whole amount was added while stirring to the above-mentioned clay dispersed solution. After this was stirred for 24 hours, an appropriate amount was cast onto a plate, then dried in a drying room controlled at 25° C. and 50% RH for 12 hours to a few days. After drying, a thin membrane was obtained, which was then heat treated for 24 hours in a 70° C. kiln. The obtained thin membrane was immersed in pure water and dried at room temperature. After this immersion and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for one day at room temperature, and heat treated for 24 hours in a 70° C. kiln, to give a silica crosslinked clay thin membrane substituted with aluminum ions.

Synthesis Example 5

Clay mineral: High purity sodium montmorillonite
Ion between layers: Aluminum (III) ions
Crosslink: Zirconium ethoxide To 400 mL of pure water was added 8 g of sodium montmorillonite at room temperature, and stirred for 24 hours to obtain an evenly dispersed solution. Meanwhile, 2 g of zirconium ethoxide was added to a solution in which 1 g of pure water and 1 g of ethanol had been mixed, and well stirred. To this solution 0.04 g of 3.5% hydrochloric acid was added while stirring. The stirring was continued for a further 10 minutes, then the whole amount was added while stirring to the above-mentioned clay dispersed solution. After this was stirred for 24 hours, an appropriate amount was cast onto a plate, then dried in a drying room controlled at 25° C. and 50% RH for 12 hours to a few days. After drying a thin membrane was obtained, which was then heat treated for 24 hours in a 70° C. kiln. The obtained thin membrane was immersed in pure water and dried at room temperature. After this immersing and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for one day at room temperature, and heat treated for 24 hours in a 70° C. kiln, to give a silica crosslinked clay thin membrane substituted with aluminum ions.

Example 3

In this example, a clay mineral thin membrane is produced which is crosslinked with an alkoxide having three functional groups and which incorporates a polyvalent metal ion between layers, and in which the clay mineral thin membrane has high flexibility and proton conductivity.

Synthesis Example 6

Clay mineral: High purity sodium montmorillonite
Ion between layers: Aluminum (III) ions
Crosslink: Triisopropylborate To 400 mL of pure water was added 8 g of sodium montmorillonite at room temperature, and stirred for 24 hours to obtain an evenly dispersed solution. Meanwhile, 1.9 g of triisopropylborate was added to a solution in which 1 g of pure water and 1 g of isopropyl alcohol had been mixed, and well stirred. To this solution 0.04 g of 3.5% hydrochloric acid was added while stirring. The stirring was continued for a further 10 minutes, then the whole amount was added while stirring to the above-mentioned clay dispersed solution. After this was stirred for 24 hours, an appropriate amount was cast onto a plate, then dried in a drying room controlled at 25° C. and 50% RH for 12 hours to a few days. After drying, a thin membrane was obtained, which was then heat treated for 24 hours in a 70° C. kiln. The obtained thin membrane was immersed in pure water and dried at room temperature. After this immersing and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give a borane crosslinked clay thin membrane substituted with aluminum ions.

Synthesis Example 7

Clay mineral: High purity sodium montmorillonite
Ion between layers: Aluminum (III) ions
Crosslink: Aluminum isopropoxide To 400 mL of pure water was added 8 g of sodium montmorillonite at room temperature, and stirred for 24 hours to obtain an evenly dispersed solution. Meanwhile, 2 g of aluminum isopropoxide was added to a solution in which 1 g of pure water and 1 g of isopropyl alcohol had been mixed, and well stirred. To this solution 0.04 g of 3.5% hydrochloric acid was added while stirring. The stirring was continued for a further 10 minutes, then the whole amount was added while stirring to the above-mentioned clay dispersed solution. After this was stirred for 24 hours, an appropriate amount was cast onto a plate, then dried in a drying room controlled at 25° C. and 50% RH for 12 hours to a few days. After drying a thin membrane was obtained, which was then heat treated for 24 hours in a 70° C. kiln. The obtained thin membrane was immersed in pure water and dried at room temperature. After this immersing and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give an alumina crosslinked clay thin membrane substituted with aluminum ions.

Example 4

In this example, a clay mineral thin membrane is produced which incorporates a polyvalent metal ion between layers, wherein a crosslinking agent is provided with a strong acid group on a functional group of an alkoxide, and in which the clay mineral thin membrane has higher proton conductivity.

Synthesis Example 8

Clay mineral: High purity sodium montmorillonite
Ion between layers: Aluminum (III) ions
Crosslink: 3-mercapto(→sulfonic acid)propyl trimethoxysilane To 400 mL of pure water was added 8 g of sodium montmorillonite at room temperature, and stirred for 24 hours to obtain an evenly dispersed solution. Meanwhile, 2.4 g of 3-mercaptopropyl trimethoxysilane was added to a solution in which 5 g of isopropyl alcohol had been mixed, and well stirred. To this solution 1.9 g of 30% hydrogen peroxide water was added while stirring cooling with ice. After stirring was continued for a further 10 minutes, the temperature was raised to 70° C. and left for 1 hour. After cooling to room temperature, the whole amount was added while stirring to the above-mentioned clay dispersed solution. An appropriate amount was cast onto a plate, then dried in a drying room controlled at 25° C. and 50% RH for 12 hours to a few days. After drying a thin membrane was obtained, which was then heat treated for 24 hours in a 70° C. kiln. The obtained thin membrane was immersed in pure water and dried at room temperature. After this immersing and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give a clay thin membrane crosslinked with silica having a sulfonic acid group and substituted with aluminum ions.

Example 5

In this example, a clay mineral thin membrane is produced which incorporates a surfactant and polyvalent metal ions between layers, and which has high gas permeability and proton conductivity.

Synthesis Example 9

Clay mineral: High purity sodium montmorillonite
Ion between layers: Aluminum (III) ions, hexadecyl trimethyl ammonium chloride
Crosslink: Phosphoric acid To 400 mL of pure water was added 8 g of sodium montmorillonite at room temperature, and stirred for 24 hours to obtain an evenly dispersed solution. To this solution 10 g of 10% orthophosphoric acid was slowly added while stirring and stirred for 1 hour. An appropriate amount was cast onto a plate, then dried in a drying room controlled at 25° C. and 50% RH for 12 hours to a few days. After drying, a thin membrane was obtained, which was then heat treated for 24 hours in a 70° C. kiln. The obtained thin membrane was immersed in pure water and dried at room temperature. After this immersion and drying was repeated several times, the membrane was dried in a 50° C. kiln to obtain a thin membrane. After immersing this thin membrane in an aqueous solution of 20% hexadecyl trimethyl ammonium chloride at room temperature for 3 hours, it was removed and dried at room temperature for 24 hours. After immersing this thin membrane in a large amount of pure water for 1 minute, it was dried at room temperature for 24 hours. After further heat treating for 24 hours in a 70° C. kiln and 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give a phosphoric acid crosslinked clay thin membrane substituted with aluminum ions and hexadecyl trimethyl ammonium chloride ions.

Example 6

In this example, a clay mineral thin membrane is produced which is crosslinked with an alkoxide having a bulky functional group (isooctyl group) and which incorporates a polyvalent metal ion between layers, and in which the clay mineral thin membrane has high gas permeability and proton conductivity.

Synthesis Example 10

Clay mineral: High purity sodium montmorillonite
Ion between layers: Aluminum (III) ions
Crosslink: Isooctyl trimethoxysilane To 400 mL of pure water was added 8 g of sodium montmorillonite at room temperature, and stirred for 24 hours to obtain an evenly dispersed solution. Meanwhile, 2.4 g of isooctyl trimethoxysilane was added to a solution in which 1 g of pure water and 5 g of isopropyl alcohol had been mixed, and well stirred. To this solution 0.04 g of 3.5% hydrochloric acid was added while stirring. The stirring was continued for a further 10 minutes, then the whole amount was added while stirring to the above-mentioned clay dispersed solution. After this was stirred for 24 hours, an appropriate amount was cast onto a plate, then dried in a drying room controlled at 25° C. and 50% RH for 12 hours to a few days. After drying a thin membrane was obtained, which was then heat treated for 24 hours in a 70° C. kiln. The obtained thin membrane was immersed in pure water and dried at room temperature. After this immersing and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give a clay thin membrane crosslinked with silica having an isooctyl group and substituted with aluminum ions.

Example 7

In this example, a clay mineral thin membrane is produced which is three-dimensionally crosslinked with a sturdy bis-alkoxysilane and which incorporates a polyvalent metal ion between layers, and in which the clay mineral thin membrane has high shape stability and proton conductivity.

Synthesis Example 11

Clay mineral: High purity sodium montmorillonite
Ion between layers: Aluminum (III) ions
Crosslink: 1,4-bis(trimethoxysilylethyl)benzene To 400 mL of pure water was added 8 g of sodium montmorillonite at room temperature, and stirred for 24 hours to obtain an evenly dispersed solution. Meanwhile, 3.7 g of 1,4-bis(trimethoxysilylethyl)benzene was added to a solution in which 1 g of pure water and 5 g of isopropyl alcohol had been mixed, and well stirred. To this solution 0.06 g of 3.5% hydrochloric acid was added while stirring. The stirring was continued for a further 10 minutes, then the whole amount was added while stirring to the above-mentioned clay dispersed solution. After this was stirred for 24 hours, an appropriate amount was cast onto a plate, then dried in a drying room controlled at 25° C. and 50% RH for 12 hours to a few days. After drying a thin membrane was obtained, which was then heat treated for 24 hours in a 70° C. kiln. The obtained thin membrane was immersed in pure water and dried at room temperature. After this immersing and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give a sturdy clay thin membrane three-dimensionally cross-linked with bis-alkoxysilane and substituted with aluminum ions.

Example 8

In this example, a clay mineral-PEO (polyethyleneoxide) complex thin membrane is produced which is crosslinked with an alkoxysilane having an epoxy ring and which incorporates a polyvalent metal ion between layers, and in which the clay mineral thin membrane has low humidity dependence and high proton conductivity.

Synthesis Example 12

Clay mineral: High purity sodium montmorillonite
Ion between layers: Aluminum (III) ions
Crosslink: 3-Glycidoxypropyl trimethoxysilane To 400 mL of pure water was added 8 g of sodium montmorillonite at room temperature, and stirred for 24 hours to obtain an evenly dispersed solution. Meanwhile, 2.4 g of 3-glycidoxypropyl trimethoxysilane was added to a solution in which 1 g of pure water and 3 g of isopropyl alcohol had been mixed, and well stirred. To this solution 0.04 g of 3.5% hydrochloric acid was added while stirring. The stirring was continued for a further 10 minutes, then the whole amount was added while stirring to the above-mentioned clay dispersed solution. After this was stirred for 24 hours, an appropriate amount was cast onto a plate, then dried in a drying room controlled at 25° C. and 50% RH for 12 hours to a few days. After drying a thin membrane was obtained, which was then heat treated for 24 hours in a 70° C. kiln. The obtained thin membrane was immersed in pure water and dried at room temperature. After this immersing and drying was repeated several times, the membrane was dried in a 50° C. kiln to obtain a thin membrane. After immersing this thin membrane for 3 hours in a large amount of 1.2 mol/L of aqueous aluminum nitrate (III) at room temperature, the thin membrane was removed and dried at room temperature for 24 hours. After immersing this thin membrane for 1 minute in a large quantity of pure water, it was dried for 24 hours at room temperature, and heat treated for 24 hours in a 70° C. kiln, to give a complexed thin membrane of clay mineral-PEO (polyethyleneoxide) crosslinked with alumina and substituted with aluminum ions.

Performance Evaluation Method

The clay membranes and complexed clay membranes of the above Synthesis Examples 1-12 were evaluated for their performance. The respective evaluation methods are described below.

Conductivity Evaluation

Alternating current impedance method 100 kHz-0.1 mHz
Tensile Strength, Stretching Test 2t autograph test piece model JIS-K6301-3½
Gas Permeability Evaluation JIS-K7126 Pressure method
Shape Stability Expansion/swelling rate (%) in the planar direction after immersion in pure water for about 24 hours Performance Evaluation Data Example 1

A Clay Mineral Thin Membrane which has High Proton Conductivity
Conductivity Level Conditions: 80° C., 90% RH
Synthesis Example 1 Al (III) substituted, Phosphoric acid crosslinking agent: 0.080 (S/cm)
Synthesis Example 2 Ni (II) substituted, Phosphoric acid crosslinking agent: 0.018 (S/cm)
Synthesis Example 3 Sn (IV) substituted, Phosphoric acid crosslinking agent: 0.110 (S/cm)
Nafion (trademark name) reference: 0.070 (S/cm)

Example 2

A Clay Mineral Thin Membrane which has High Proton Conductivity
Conductivity Level
Conditions: 80° C., 90% RH
Synthesis example 4 Al (III) substituted, Silica crosslink: 0.054 (S/cm)
Synthesis example 5 Al (III) substituted, Zirconia crosslink: 0.075 (S/cm)
Nafion (trademark name) reference: 0.070 (S/cm)
Tensile Strength
Synthesis example 4 Al (III) substituted, Silica crosslink: 22 (Mpa)
Synthesis example 5 Al (III) substituted, Zirconia crosslink: 30 (Mpa)
Nafion (trademark name) reference: 10 (Mpa)

Example 3

A Clay Mineral Thin Membrane which has High Flexibility and Proton Conductivity
Conductivity Level
Conditions: 80° C., 90% RH
Synthesis example 6 Al (III) substituted, Borate crosslink: 0.066 (S/cm)
Synthesis example 7 Al (III) substituted, Alumina crosslink: 0.031 (S/cm)
Nafion (trademark name) reference: 0.070 (S/cm)
Tension Stretch
Synthesis example 6 Al (III) substituted, Borate crosslink: 35%
Synthesis example 7 Al (III) substituted, Alumina crosslink: 27%
Synthesis example 1 Al (III) substituted, Phosphoric acid crosslink: 4%

Example 4

A Clay Mineral Thin Membrane which has Higher Proton Conductivity
Conductivity Level
Conditions: 80° C., 90% RH
Synthesis example 8 Al (III) substituted, sulfonic acid-containing alkoxide crosslink: 0.138 (S/cm)
Nafion (trademark name) reference: 0.070 (S/cm)

Example 5

A Clay Mineral Thin Membrane Incorporating a Surfactant and a Polyvalent Metal Ion Between Layers and which has High Gas Permeability and Proton Conductivity
Conductivity Level
Conditions: 80° C., 90% RH
Synthesis example 9 Al (III) substituted, phosphoric acid crosslink: 0.009 (S/cm)
Nafion (trademark name) reference: 0.070 (S/cm)
Oxygen gas permeability coefficient
Conditions: 80° C., 50% RH
Synthesis example 9 Al (III) substituted, phosphoric acid crosslink: $5.6 \times 10^{-7}$ ($cm^3\ cm^{-1}\ s^{-1}\ Hg^{-1}$)
Nafion (trademark name) reference: $7.0 \times 10^{-9}$ ($cm^3\ cm^{-1}\ s^{-1}\ Hg^{-1}$)

Example 6

A Clay Mineral Thin Membrane Having High Gas Permeability and Proton Conductivity (the Clay Mineral Thin Membrane being Crosslinked with an Alkoxide which has a Bulky Functional Group (Isooctyl Group) and Incorporates a Polyvalent Metal Ion Between Layers)
Conductivity Level
Conditions: 80° C., 90% RH
Synthesis example 10 Al (III) substituted, isooctyl-containing alkoxide crosslink: 0.082 (S/cm)
Nafion (trademark name) reference: 0.070 (S/cm)
Oxygen Gas Permeability Coefficient
Conditions: 80° C., 50% RH
Synthesis example 10 Al (III) substituted, isooctyl-containing alkoxide crosslink: $6.3 \times 10^{-8}$ ($cm^3\ cm^{-1}\ s^{-1}\ Hg^{-1}$)
Nafion (trademark name) reference: $7.0 \times 10^{-9}$ ($cm^3\ cm^{-1}\ s^{-1}\ Hg^{-1}$)

Example 7

A Clay Mineral Thin Membrane Having High Shape Stability and Proton Conductivity
Conductivity Level
Conditions: 80° C., 90% RH
Synthesis example 11 Al (III) substituted, 1,4-bis(trimethoxysilylethyl)benzene crosslink: 0.073 (S/cm)
Nafion (trademark name) reference: 0.070 (S/cm)
Size Change when Water-Swollen (Planar Direction)
Synthesis example 11 Al (III) substituted, 1,4-bis(trimethoxysilylethyl)benzene crosslink: 1 (%)
Synthesis example 1 Al (III) substituted, phosphoric acid crosslink: 6 (%)
Nafion (trademark name) reference: 15 (%)

Example 8

A Clay Mineral Thin Membrane Having Low Humidity Dependence and High Proton Conductivity
Conductivity Level
Conditions: 80° C., 90% RH
Synthesis example 12 Al (III) substituted, 3-glycidoxypropyltrimethoxysilane crosslink: 0.084 (S/cm)
Synthesis example 1 Al (III) substituted, phosphate acid crosslink: 0.080 (S/cm)
Nafion (trademark name) reference: 0.070 (S/cm)
Conditions: 80° C., 30% RH
Synthesis example 12 Al (III) substituted, 3-glycidoxypropyltrimethoxysilane crosslink: 0.062 (S/cm)

Synthesis example 1 Al (III) substituted, phosphate acid crosslink: 0.010 (S/cm)

Nafion (trademark name) reference: 0.015 (S/cm)

According to the above results, it can be said that the proton conducting material membrane of the present invention has high proton conductivity with membrane strength, wherein it is useful as a material for a fuel cell.

According to the present invention, a proton conducting material, proton conducting membrane is produced which has high proton conductivity, high strength, flexibility (strong against deformation), high size stability when swollen (water absorbed), and which can become a substitution for a conventional perflurocarbonsulfonic acid based proton conducting membrane.

In addition, a proton conducting material, proton conducting membrane of the present invention are all produced from non polluting materials, so that in terms of environmental problems this is also a superior technology.

What is claimed is:

1. A proton conducting membrane which is formed by crosslinking a unit structure of a layered clay mineral, wherein a polyvalent metal ion is incorporated between layers of said layered clay mineral, and wherein the unit structure of the layered clay mineral is crosslinked with a tetrafunctional alkoxide or a trifunctional alkoxide.

2. The proton conducting membrane according to claim 1, wherein the crosslinking tetrafunctional alkoxide or trifunctional alkoxide incorporates a strong acid group.

3. A proton conducting membrane which is formed by crosslinking a unit structure of a layered clay mineral, wherein a polyvalent metal ion is incorporated between layers of said layered clay mineral, and wherein a cationic surfactant is incorporated between layers of the layered clay mineral.

4. A proton conducting membrane which is formed by crosslinking a unit structure of a layered clay mineral, wherein a polyvalent metal ion is incorporated between layers of said layered clay mineral, and wherein the unit structure of the layered clay mineral is crosslinked with an alkoxide having a functional group.

5. A proton conducting membrane which is formed by crosslinking a unit structure of a layered clay mineral, wherein a polyvalent metal ion is incorporated between layers of said layered clay mineral, and wherein the unit structure of the layered clay mineral is crosslinked with bis-alkoxysilane.

6. A proton conducting membrane which is formed by crosslinking a unit structure of a layered clay mineral, wherein a polyvalent metal ion is incorporated between layers of said layered clay mineral, and wherein the unit structure of the layered clay mineral is crosslinked with an alkoxysilane having an epoxy ring.

7. A method for producing a proton conducting membrane which comprises the steps of: adding water to a layered clay mineral for obtaining a dispersed solution; adding a crosslinking agent to the dispersed solution for obtaining a developing liquid; developing the developing liquid on the substrate for obtaining a developing layer; heating and drying the developing layer for obtaining a membrane; and immersing the membrane in an aqueous solution containing polyvalent ions, and drying.

8. A method for producing a proton conducting membrane which comprises the steps of: producing a proton conducting material according to the method according to claim 7; dissolving or dispersing the proton conducting material for preparing a solution or a sol; and gelating by the removal of solvent from the solution or sol.

9. A solid polymer fuel cell comprising a membrane electrode assembly (MEA) which comprises (a) a polymer solid electrolyte membrane; and (b) a gas diffusion electrode, which electrode couples with the electrolyte membrane and has as a main constituent material an electrode catalyst which comprises a conductive carrier that supports a catalytic metal and a proton conducting membrane, wherein the polymer solid electrolyte membrane and/or the proton conducting membrane is the proton conducting membrane according to claim 1.

10. A solid polymer fuel cell comprising a membrane electrode assembly (MEA) which comprises (a) a polymer solid electrolyte membrane; and (b) a gas diffusion electrode, which electrode couples with the electrolyte membrane and has as a main constituent material an electrode catalyst which comprises a conductive carrier that supports a catalytic metal and a proton conducting membrane, wherein the polymer solid electrolyte membrane and/or the proton conducting membrane is the proton conducting membrane according to claim 3.

11. A solid polymer fuel cell comprising a membrane electrode assembly (MEA) which comprises (a) a polymer solid electrolyte membrane; and (b) a gas diffusion electrode, which electrode couples with the electrolyte membrane and has as a main constituent material an electrode catalyst which comprises a conductive carrier that supports a catalytic metal and a proton conducting membrane, wherein the polymer solid electrolyte membrane and/or the proton conducting membrane is the proton conducting membrane according to claim 4.

12. A solid polymer fuel cell comprising a membrane electrode assembly (MEA) which comprises (a) a polymer solid electrolyte membrane; and (b) a gas diffusion electrode, which electrode couples with the electrolyte membrane and has as a main constituent material an electrode catalyst which comprises a conductive carrier that supports a catalytic metal and a proton conducting membrane, wherein the polymer solid electrolyte membrane and/or the proton conducting membrane is the proton conducting membrane according to claim 5.

13. A solid polymer fuel cell comprising a membrane electrode assembly (MEA) which comprises (a) a polymer solid electrolyte membrane; and (b) a gas diffusion electrode, which electrode couples with the electrolyte membrane and has as a main constituent material an electrode catalyst which comprises a conductive carrier that supports a catalytic metal and a proton conducting membrane, wherein the polymer solid electrolyte membrane andlor the proton conducting membrane is the proton conducting membrane according to claim 6.

* * * * *